Patented Feb. 15, 1927.

1,618,078

UNITED STATES PATENT OFFICE.

IGNATZ GEDAROVICH, OF BROOKLYN, NEW YORK.

ROOFING COMPOUND.

No Drawing.  Application filed November 12, 1925. Serial No. 68,709.

This invention relates to roofing compound.

The object of the invention is to provide a roofing compound which will be fireproof and waterproof; to provide a roofing compound which can be kept in containers in plastic condition and which can be applied in the plastic condition, and which will form a hard, firm, and durable outer covering or coating upon roof structures and walls to which it is applied. This object is attained in the manner hereinafter set forth.

The improved compound comprises substantially 20% of sand, 20% of cement, 20% of plaster, 18% of asbestos, 4% of varnish, and 18% of oil of tar. If desired instead of the sand and cement an equivalent quantity of clay may be utilized. The plaster will consist preferably of the usual quantities of lime, sand, and water.

In preparing the compound the plastery material, sand and cement in the proportions mentioned are thoroughly mixed. The oil of tar, asbestos and pure varnish in the proportions mentioned are thoroughly mixed. The two batches are then brought together and are thoroughly mixed and stirred to produce the compound. If desired the varnish may be omitted. The compound in certain quantities is placed in suitable containers until used.

The water repellent qualities of the compound are increased by increasing the percentage of the sand and cement or by substituting an equivalent amount of clay in lieu of the sand and cement. The heat resisting qualities may be varied according to the uses to which the compound is to be put by increasing the proportion of the powdered asbestos.

The compound is applicable to all forms of lathing including wire lathing, to rough board structure, and is capable of application for effecting repairs to all kinds of exterior surfaces. After the compound has been applied the same dries and hardens and becomes a firm and durable coating or covering of a homogeneous character.

The oil of tar used gives to the compound a certain amount of elasticity which compensates for expansion and contraction due to varying temperature and thus prevents cracking of the coating or covering formed.

It is to be understood that the particular proportions set forth hereinabove are not to be strictly adhered to as the proportions of the respective ingredients employed may be varied to meet different conditions.

What I claim is:

A roofing compound consisting substantially of 20% sand, 20% cement, 20% plaster, 18% asbestos, 4% varnish, and 18% oil of tar.

IGNATZ GEDAROVICH.